US008878500B2

(12) United States Patent
Jeong et al.

(10) Patent No.: US 8,878,500 B2
(45) Date of Patent: Nov. 4, 2014

(54) POWER FACTOR CORRECTION CIRCUIT WITH ACTIVE SNUBBER AND POWER SUPPLY INCLUDING THE SAME

(71) Applicant: Samsung Electro-Mechanics Co., Ltd., Gyunggi-do (KR)

(72) Inventors: In Wha Jeong, Gyunggi-do (KR); Bum Seok Suh, Gyunggi-do (KR); Kwang Soo Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/781,458

(22) Filed: Feb. 28, 2013

(65) Prior Publication Data
US 2014/0160817 A1    Jun. 12, 2014

(30) Foreign Application Priority Data

Dec. 11, 2012 (KR) .................. 10-2012-0143965

(51) Int. Cl.
| G05F 3/16 | (2006.01) |
| G05F 1/00 | (2006.01) |
| G05F 1/70 | (2006.01) |

(52) U.S. Cl.
CPC ........................................ *G05F 1/70* (2013.01)
USPC ............................................ 323/225; 323/290

(58) Field of Classification Search
CPC ....... H02M 1/34; H02M 1/42; H02M 1/4208; H02M 1/4225; H02M 2001/34; H02M 2001/42; H02M 2001/342; H02M 2001/344; H02M 2001/346; H02M 2001/348
USPC ................. 323/205, 207–209, 222–224, 259, 323/282–285, 210, 225, 290; 363/89, 363/126–127, 84
See application file for complete search history.

(56) References Cited

U.S. PATENT DOCUMENTS

| 5,313,382 | A | * | 5/1994 | Farrington ...................... 363/16 |
| 5,418,704 | A | * | 5/1995 | Hua et al. ...................... 323/282 |
| 5,477,131 | A | * | 12/1995 | Gegner ......................... 323/222 |
| 5,486,752 | A | * | 1/1996 | Hua et al. ...................... 323/222 |
| 5,636,114 | A | * | 6/1997 | Bhagwat et al. ............. 363/56.12 |
| 5,815,386 | A | * | 9/1998 | Gordon ........................... 363/50 |
| 5,923,153 | A | * | 7/1999 | Liu ............................... 323/222 |
| 5,959,438 | A | * | 9/1999 | Jovanovic et al. ............ 323/222 |
| 6,987,379 | B2 | * | 1/2006 | Peron ............................ 323/225 |
| 6,987,675 | B2 | * | 1/2006 | Jovanovic et al. .......... 363/21.01 |

(Continued)

FOREIGN PATENT DOCUMENTS

| KR | 20090066954 A | 6/2009 |
| KR | 2012-0050264 A | 5/2012 |

*Primary Examiner* — Timothy J Dole
*Assistant Examiner* — Ivan Laboy Andino
(74) *Attorney, Agent, or Firm* — McDermott Will & Emery LLP (57) ABSTRACT

There are provided a power factor correction circuit, and a power supply including the same, the power factor correction circuit including a main switch adjusting a phase difference between a current and a voltage of input power, a main inductor storing or discharging the power according to switching of the main switch, a snubber circuit unit including a snubber switch forming a transfer path for surplus power present before the main switch is turned on and a snubber inductor adjusting an amount of a current applied to the snubber switch, and a reduction circuit unit including an auxiliary inductor inductively coupled to the snubber inductor and an auxiliary resistor consuming power induced from the snubber inductor through the auxiliary inductor.

24 Claims, 5 Drawing Sheets

(56) References Cited

U.S. PATENT DOCUMENTS

| | | | |
|---|---|---|---|
| 8,203,322 B2* | 6/2012 | Okubo et al. | 323/285 |
| 8,581,147 B2* | 11/2013 | Kooken et al. | 219/137.7 |
| 2005/0226012 A1* | 10/2005 | Jovanovic et al. | 363/59 |
| 2010/0156194 A1* | 6/2010 | Navid et al. | 307/105 |
| 2011/0199066 A1 | 8/2011 | Shao et al. | |
| 2012/0163052 A1* | 6/2012 | Yonezawa et al. | 363/126 |
| 2012/0275203 A1* | 11/2012 | Shimada et al. | 363/84 |
| 2013/0069569 A1* | 3/2013 | Park et al. | 318/400.3 |

* cited by examiner

POWER FACTOR CORRECTION CIRCUIT WITH ACTIVE SNUBBER AND POWER SUPPLY INCLUDING THE SAME

CROSS-REFERENCE TO RELATED APPLICATIONS

This application claims the priority of Korean Patent Application No. 10-2012-0143965 filed on Dec. 11, 2012, in the Korean Intellectual Property Office, the disclosure of which is incorporated herein by reference.

BACKGROUND OF THE INVENTION

1. Field of the Invention

The present invention relates to a power factor correction circuit and a power supply including the same.

2. Description of the Related Art

Recently, the governments of many countries have recommended the efficient use of energy according to energy efficiency policies, and in particular, the implementation of efficient energy usage in electronic products and home appliances is widely recommended.

In efficiently using energy according to such a governmental recommendation, a correction circuit for implementing efficient energy usage is largely applied to a power supply device that supplies power to electronic products, home appliances, and the like.

A power factor correction circuit is an example of the correction circuit. The power factor correction circuit is a circuit that switches input power to adjust a phase difference (power factor) between a current and a voltage of the input power in such a manner that power is effectively transferred to a rear stage.

However, when this power factor correction circuit performs a switching operation in order to adjust the phase difference of the input power, a peak voltage may be generated, such that a switching element may be damaged and switching loss may occur.

Patent Document 1, the following related art document, relates to a power factor improvement circuit for improving a power factor using energy accumulated in an inductor of a snubber circuit unit, but does not disclose a technical point for decreasing a spike voltage generated during switching.

RELATED ART DOCUMENT (Patent Document 1) US Patent Laid-Open Publication No. 2011/0199066

SUMMARY OF THE INVENTION

An aspect of the present invention provides a power factor correction circuit capable of decreasing a peak voltage generated at the time at which a snubber switch providing a zero-voltage turn-on condition to a main switch switching input power to improve a power factor thereof is turned off, and a power supply including the same.

According to an aspect of the present invention, there is provided a power factor correction circuit, including: a main switch adjusting a phase difference between a current and a voltage of input power; a main inductor storing or discharging the power according to switching of the main switch; a snubber circuit unit including a snubber switch forming a transfer path for surplus power present before the main switch is turned on and a snubber inductor adjusting an amount of a current applied to the snubber switch; and a reduction circuit unit including an auxiliary inductor inductively coupled to the snubber inductor and an auxiliary resistor consuming power induced from the snubber inductor through the auxiliary inductor.

The auxiliary inductor may be inductively coupled to the main inductor to transfer the power induced from the snubber inductor to the main inductor, and the auxiliary resistor may consume the power induced from the main inductor through the auxiliary inductor.

The snubber inductor may be inductively coupled to the main inductor to transfer the power to the main inductor.

The auxiliary resistor may detect the power induced through the auxiliary inductor as a current.

The snubber switch may be turned on for a preset first time, and the main switch may be turned on after a preset first delay time has elapsed from a time at which the snubber switch is turned on.

The first time may be longer than the first delay time.

The power factor correction circuit may further include a reverse current preventing diode preventing a reverse current of the main switch.

The power factor correction circuit may further include a diode providing a transfer path for the power released from the main inductor according to the switching of the main switch.

The power factor correction circuit may further include a controller providing switching control signals controlling switching operations of the main switch and the snubber switch.

The input power may be rectified power.

The main inductor, the snubber inductor, and the auxiliary inductor may be formed in a single magnetic core.

According to another aspect of the present invention, there is provided a power supply, including: a power factor correction circuit including a main switch adjusting a phase difference between a current and a voltage of input power; a main inductor storing or discharging the power according to a switching operation of the main switch; a snubber circuit unit including a snubber switch forming a transfer path for surplus power present before the main switch is turned on and a snubber inductor adjusting an amount of a current applied to the snubber switch; and a reduction circuit unit including an auxiliary inductor inductively coupled to the snubber inductor and an auxiliary resistor consuming power induced from the snubber inductor through the auxiliary inductor; a power converting unit switching the power from the power factor correction circuit to convert the power into power having a preset level; and a switching controlling unit controlling the switching of the power performed by the power converting unit.

The auxiliary inductor may be inductively coupled to the main inductor to transfer the power induced from the snubber inductor to the main inductor, and the auxiliary resistor may consume the power induced from the main inductor through the auxiliary inductor.

The snubber inductor may be inductively coupled to the main inductor to transfer the power to the main inductor.

The auxiliary resistor may detect the power induced through the auxiliary inductor as a current.

The snubber switch may be turned on for a preset first time, and the main switch may be turned on after a preset first delay time has elapsed from a time at which the snubber switch is turned on.

The first time may be longer than the first delay time.

The power factor correction circuit may further include a reverse current preventing diode preventing a reverse current of the main switch.

The power factor correction circuit may further include a diode providing a transfer path for the power released from the main inductor according to the switching of the main switch.

The power factor correction circuit may further include a capacitor stabilizing the power transferred from the diode.

The power factor correction circuit may further include a controller providing switching control signals controlling switching operations of the main switch and the snubber switch.

The power supply may further include a rectifying unit transferring the input power generated by rectifying alternating current (AC) power to the power factor correction circuit.

The main inductor, the snubber inductor, and the auxiliary inductor may be formed in a single magnetic core.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
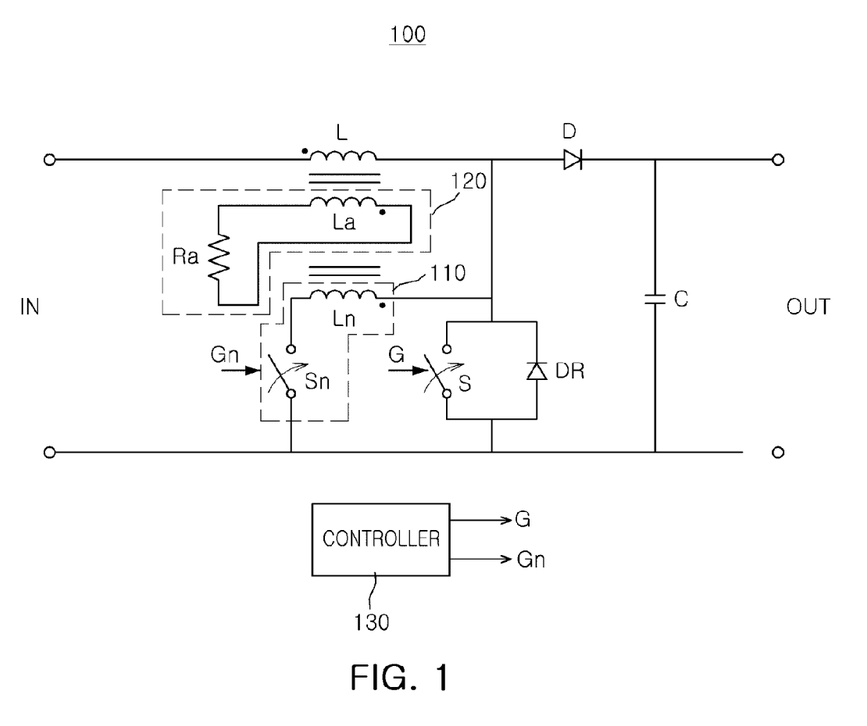
FIGS. 1 and 2 are circuit views schematically showing a power factor correction circuit according to an embodiment of the present invention.
Figure 2:
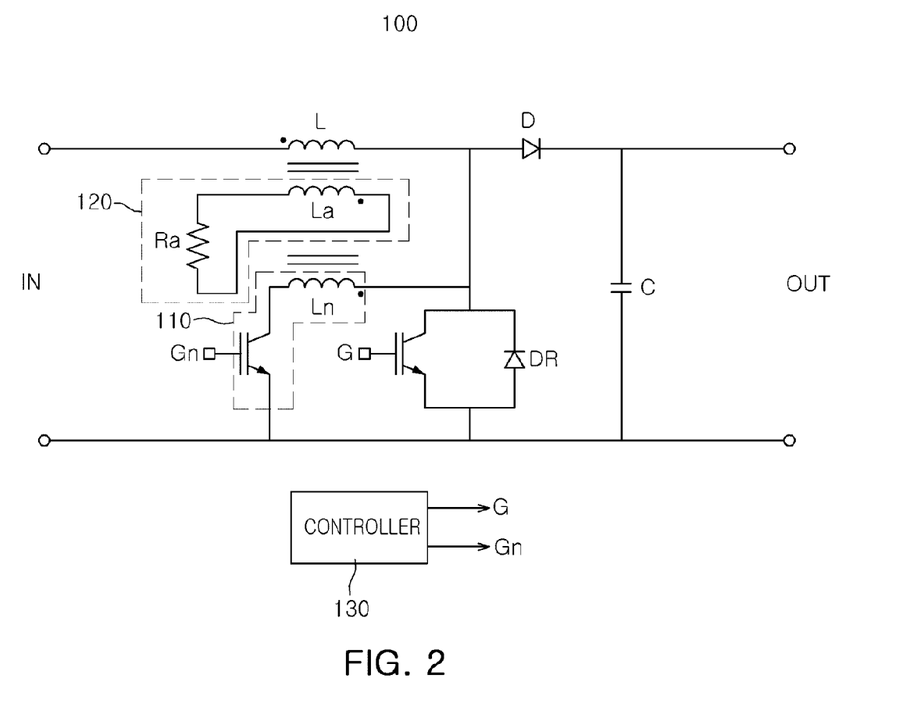

FIGS. 1 and 2 are circuit views schematically showing a power factor correction circuit 100 according to an embodiment of the present invention.

Referring to FIG. 1, the power factor correction circuit 100 according to the embodiment of the present invention may include a main inductor L, a main switch S, a snubber circuit unit 110, and a reduction circuit unit 120, and may further include a diode D, a capacitor C, a reverse current preventing diode DR, and a controller 130.

The main switch S may perform a switching operation to adjust a phase difference between a voltage and a current of input power input from an input terminal IN. Here, the input power may be rectified power.

The reverse current preventing diode DR may prevent a reverse current of the main switch S by providing a bypass path from an anode to a cathode of the reverse current preventing diode DR, when the reverse current is applied to the main switch S. When the main switch S is configured of a transistor, the reverse current preventing diode DR may be a diode formed in a body of the transistor. However, the reverse current preventing diode DR is not limited thereto and may be a separate diode.

The main inductor L may be disposed between the input terminal IN receiving the input power and the main switch S to thereby store or release the power according to the switching operation of the main switch S and the diode D may provide a transfer path for the power released from the main inductor L according to the switching operation of the main switch S. In addition, the capacitor C may be connected to an output terminal OUT in parallel to thereby stabilize the power output from the diode D.

The snubber circuit unit 110 may include a snubber switch Sn connected to the main switch in parallel and a snubber inductor Ln provided between the snubber switch Sn and the main switch S to adjust an amount of a current flowing in the snubber switch Sn.

The controller 130 may generate switching control signals G and Gn controlling switching operations of the main switch S and the snubber switch Sn.

The main switch S and the snubber switch Sn according to the embodiment of the present invention may be configured of one of an insulated gate bipolar transistor (IGBT), a metal oxide semiconductor field-effect transistor (MOS-FET) and a bipolar junction transistor (BJT). Referring to FIG. 2, although FIG. 2 shows an example in which the main switch S and the snubber switch Sn are configured of the BJTs, the present invention is not limited thereto.

Figure 3:
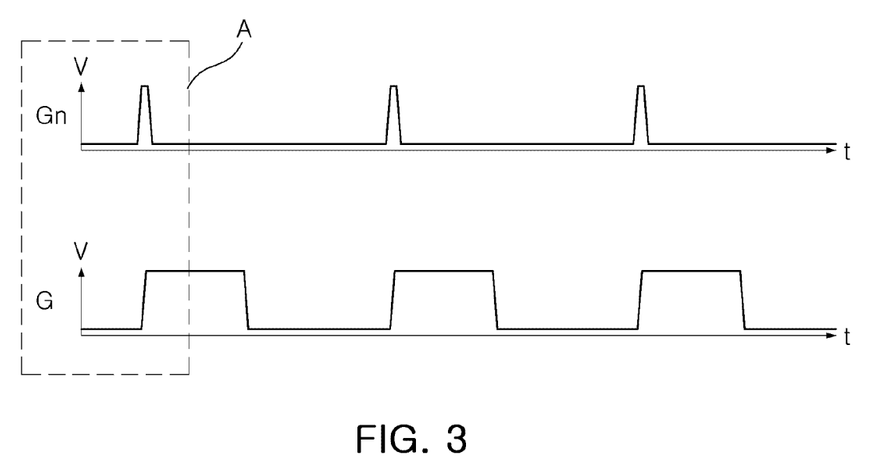
FIG. 3 is a graph illustrating switching control signals of a main switch and a snubber switch employed in the power factor correction circuit according to the embodiment of the present invention.
Figure 4:
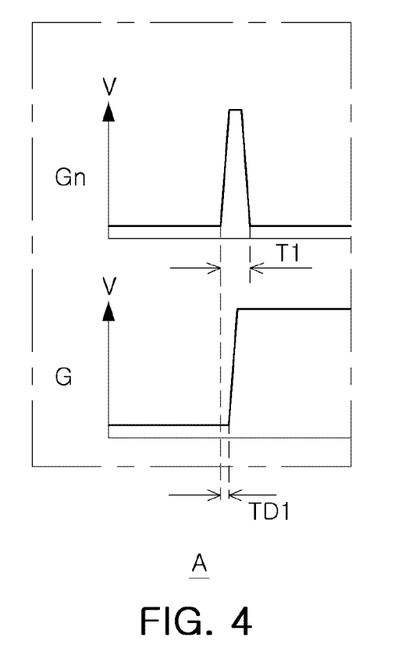
FIG. 4 is an enlarged view of part A of FIG. 3.

FIG. 3 is a graph illustrating switching control signals of the main switch S and the snubber switch Sn employed in the power factor correction circuit 100 according to the embodiment of the present invention and FIG. 4 is an enlarged view of part A of FIG. 3. In the case in which the switching control signals G and Gn are at high levels, the main switch S and the snubber switch Sn are turned on and in the case in which the switching control signals G and Gn are at low levels, the main switch S and the snubber switch Sn are turned off.

The main switch S of the power factor correction circuit 100 according to the embodiment of the present invention may perform the switching operation to adjust the phase difference between the voltage and the current of the input power, thereby improving the power factor of the input power. In this case, the snubber switch Sn may bypass surplus power remaining during on and off switching of the main switch S to a ground, whereby a zero-voltage switching condition may be provided to the main switch S. Therefore, switching loss of the main switch S may be removed.

As shown in FIGS. 3 and 4, the snubber switch Sn is turned on earlier than the main switch S by a first delay time TD1, thereby forming a transfer path for the surplus power. Here, the snubber switch Sn may be turned on for a first time T1. In this case, the first time T1 is set to be longer than the first delay time TD1, such that the snubber switch Sn may be turned off before the main switch S is turned off.

Meanwhile, when the snubber switch Sn is turned on, in order to prevent the current having a high current level from being applied to the snubber switch Sn, the snubber inductor Ln is provided between the snubber switch Sn and the main switch S. In this configuration, when the snubber switch Sn is turned off, since a path through which the current flowing in the snubber inductor Ln is conducted is not present, a peak voltage is generated across the snubber switch Sn, whereby damage to the snubber switch Sn and switching loss thereof may occur.

Figure 5A:
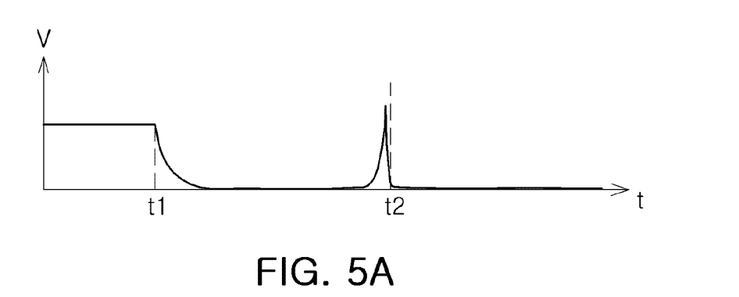
FIGS. 5A and 5B are graphs respectively showing voltage generated across the snubber switch employed in the power factor correction circuit according to the embodiment of the present invention.
Figure 5B:
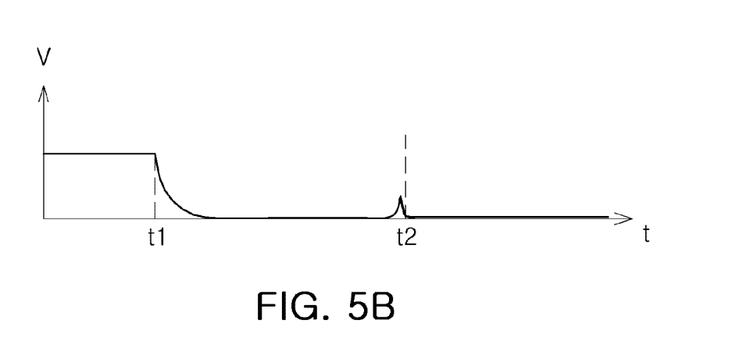

FIGS. 5A and 5B are graphs respectively showing voltage generated across the snubber switch Sn employed in the power factor correction circuit according to the embodiment of the present invention. FIG. 5A is a graph showing the voltage generated across the snubber switch Sn when the path through which the current flowing in the snubber inductor Ln is conducted is not present, during the turning off of the snubber switch Sn.

Before the first time t1, the snubber switch Sn may be turned off, such that a high voltage is generated across the snubber switch Sn. Thereafter, at the first time t1, the snubber switch Sn is turned on, such that a low voltage is generated across the snubber switch Sn. However, at a time t2, when the snubber switch Sn is turned on, since the path through which the current flowing in the snubber inductor Ln is conducted is not present, a high peak voltage is generated.

In order to reduce the peak voltage, referring to FIG. 1, the power factor correction circuit may employ the reduction circuit unit 120.

The reduction circuit unit 120 may include an auxiliary inductor La electromagnetically inductively coupled to the snubber inductor Ln and an auxiliary resistor Ra consuming power induced through the auxiliary inductor La. The auxiliary inductor La is inductively coupled to the snubber inductor Ln to receive the current flowing in the snubber inductor Ln as the power during the turning-off the snubber switch Sn, thereby providing a path for the current.

In addition, the auxiliary inductor La may be electromagnetically inductively coupled to the main inductor L to thereby transfer the power induced from the snubber inductor Ln to the main inductor L. Here, as shown in FIG. 1, the snubber inductor Ln and the auxiliary inductor La are inductively coupled to each other in a harmony mode (dots are disposed in the same direction), and the auxiliary inductor La and the main inductor L are inductively coupled to each other in a differential mode (dots are disposed in opposite directions), such that the power transferred from the snubber inductor Ln to the main inductor L through the auxiliary inductor La may be recycled. That is, a part of the power transferred from the snubber inductor Ln may be transferred to the reduction circuit unit 120 and consumed by the auxiliary resistor Ra, and another part of the power transferred from the snubber inductor Ln may be transferred to the main inductor L to be recycled.

In addition, the snubber inductor Ln according to the embodiment of the present invention may not only transfer power to the main inductor L through the auxiliary inductor La, but also directly transfer the power to the main inductor L by being inductively coupled to the main inductor L.

The main inductor L, the snubber inductor Ln, and the auxiliary inductor La according to the embodiment of the present invention may be formed in a single magnetic core. That is, the main inductor L, the snubber inductor Ln, and the auxiliary inductor La may share a single core. In this case, an inductor mounted space and cost may be saved.

In addition, in a section in which the snubber switch Sn is turned off, since the snubber inductor Ln is opened and thus, is not coupled to the main inductor L and the auxiliary inductor La, the auxiliary inductor La receives the power from the main inductor L. In this case, the auxiliary resistor Ra may measure the current flowing in the main inductor L. That is, the auxiliary resistor Ra may be operated as a current sensor. Therefore, an external current sensor may be removed, whereby a cost and a mounting area of the entire power factor correction circuit may be decreased.

FIG. 5B is a graph showing the voltage generated across the snubber switch Sn when the path through which the current flowing in the snubber inductor Ln is conducted is present, during the turning off of the snubber switch Sn. Comparing FIGS. 5A and 5B, it may be appreciated that the peak voltage is reduced at the time t2.

Figure 6:
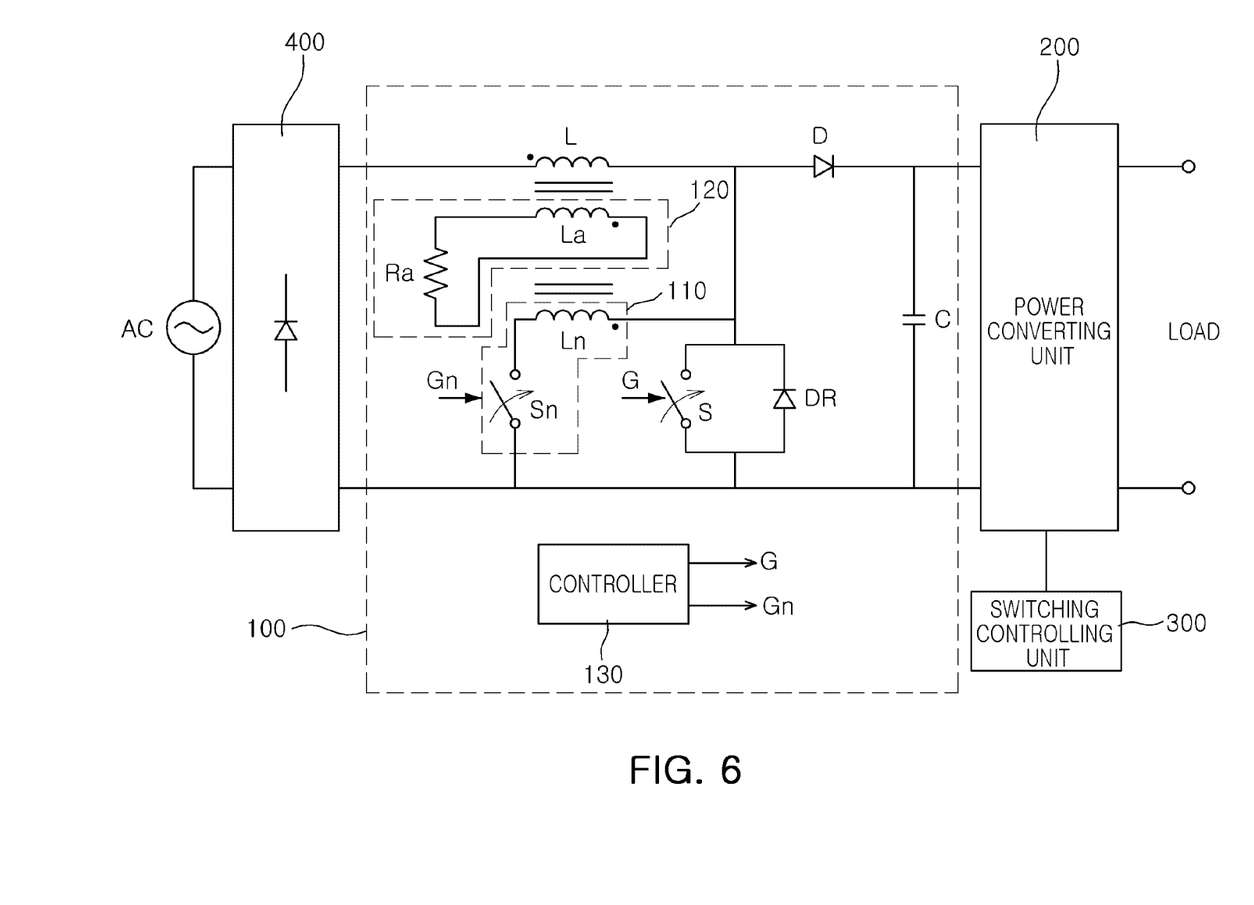
FIG. 6 is a view schematically showing a configuration of a power supply including a power factor correction circuit according to an embodiment of the present invention.

FIG. 6 is a view schematically showing a configuration of a power supply including the power factor correction circuit 100 according to an embodiment of the present invention.

Referring to FIG. 6, the power supply may include the power factor correction circuit 100, a power converting unit 200, a switching controlling unit 300, and a rectifying unit 400.

The power factor correction circuit 100 of FIG. 6 is the same as the power factor correction circuit 100 shown in FIG. 1. Therefore, a detailed description thereof will be omitted.

The power converting unit 200 may switch direct current (DC) power from the power factor correction circuit to convert the DC power into DC power having a preset voltage level and then supply the converted DC power to a load, the switching controlling unit 300 may control the switching of the power converting unit 200 according to a voltage or current level of the output DC power, and the rectifying unit 400 may transfer the input power generated by rectifying alternating current (AC) power to the power factor correction circuit 100.

As set forth above, according to the embodiment of the present invention, the zero-voltage turn-on condition is provided to the main switch switching the input power to improve the power factor thereof, whereby damage to the main switch may be prevented and switching loss thereof may be decreased.

In addition, the peak voltage that may be generated across the snubber switch providing the zero-voltage turn-on condition to the main switch is transferred to the main inductor through power coupling, whereby damage to the snubber switch may be prevented and power recycle may be may be allowed.

While the present invention has been shown and described in connection with the embodiments, it will be apparent to those skilled in the art that modifications and variations can be made without departing from the spirit and scope of the invention as defined by the appended claims.

What is claimed is:

1. A power factor correction circuit, comprising:
   a main switch adjusting a phase difference between a current and a voltage of input power;
   a main inductor generating output power by storing or discharging the power according to switching of the main switch;
   a snubber circuit unit including a snubber switch forming a transfer path for surplus power present before the main switch is turned on and a snubber inductor adjusting an amount of a current applied to the snubber switch; and
   a reduction circuit unit including an auxiliary inductor inductively coupled to the snubber inductor and an auxiliary resistor consuming power induced from the snubber inductor through the auxiliary inductor,
   wherein the auxiliary inductor is inductively coupled to the main inductor to transfer the power induced from the snubber inductor to the main inductor, and the main inductor recycles the power transferred from the auxiliary inductor to the output power.

2. The power factor correction circuit of claim 1, wherein the snubber inductor is inductively coupled to the main inductor to transfer the power to the main inductor.

3. The power factor correction circuit of claim 1, wherein the auxiliary resistor detects the power induced through the auxiliary inductor as a current.

4. The power factor correction circuit of claim 1, wherein the snubber switch is turned on for a preset first time, and the main switch is turned on after a preset first delay time has elapsed from a time at which the snubber switch is turned on.

5. The power factor correction circuit of claim 4, wherein the preset first time is longer than the preset first delay time.

6. The power factor correction circuit of claim 1, further comprising a reverse current preventing diode preventing a reverse current of the main switch.

7. The power factor correction circuit of claim 1, further comprising a diode providing a transfer path for the power released from the main inductor according to the switching of the main switch.

8. The power factor correction circuit of claim 7, further comprising a capacitor stabilizing the power transferred from the diode.

9. The power factor correction circuit of claim 1, further comprising a controller providing switching control signals controlling switching operations of the main switch and the snubber switch.

10. The power factor correction circuit of claim 1, wherein the input power is rectified power.

11. The power factor correction circuit of claim 1, wherein the main inductor, the snubber inductor, and the auxiliary inductor are formed in a single magnetic core.

12. The power factor correction circuit of claim 1, wherein the auxiliary resistor of the reduction circuit unit is coupled in series with the auxiliary inductor to consume power induced from the snubber inductor and from the main inductor through the auxiliary inductor.

13. A power supply, comprising:
a power factor correction circuit including a main switch adjusting a phase difference between a current and a voltage of input power; a main inductor generating output power by storing or discharging the power according to a switching operation of the main switch; a snubber circuit unit including a snubber switch forming a transfer path for surplus power present before the main switch is turned on and a snubber inductor adjusting an amount of a current applied to the snubber switch; and a reduction circuit unit including an auxiliary inductor inductively coupled to the snubber inductor and an auxiliary resistor consuming power induced from the snubber inductor through the auxiliary inductor;
a power converting unit switching the power from the power factor correction circuit to convert the power into power having a preset level; and
a switching controlling unit controlling the switching of the power performed by the power converting unit,
wherein the auxiliary inductor is inductively coupled to the main inductor to transfer the power induced from the snubber inductor to the main inductor, and
the main inductor recycles the power transferred from the auxiliary inductor to the output power.

14. The power supply of claim 13, wherein the snubber inductor is inductively coupled to the main inductor to transfer the power to the main inductor.

15. The power supply of claim 13, wherein the auxiliary resistor detects the power induced through the auxiliary inductor as a current.

16. The power supply of claim 13, wherein the snubber switch is turned on for a preset first time, and the main switch is turned on after a preset first delay time has elapsed from a time at which the snubber switch is turned on.

17. The power supply of claim 16, wherein the preset first time is longer than the preset first delay time.

18. The power supply of claim 13, wherein the power factor correction circuit further includes a reverse current preventing diode preventing a reverse current of the main switch.

19. The power supply of claim 13, wherein the power factor correction circuit further includes a diode providing a transfer path for the power released from the main inductor according to the switching of the main switch.

20. The power supply of claim 19, wherein the power factor correction circuit further includes a capacitor stabilizing the power transferred from the diode.

21. The power supply of claim 13, wherein the power factor correction circuit further includes a controller providing switching control signals controlling switching operations of the main switch and the snubber switch.

22. The power supply of claim 13, further comprising a rectifying unit transferring the input power generated by rectifying alternating current (AC) power to the power factor correction circuit.

23. The power supply of claim 13, wherein the main inductor, the snubber inductor, and the auxiliary inductor are formed in a single magnetic core.

24. The power supply of claim 13, wherein the auxiliary resistor of the reduction circuit unit is coupled in series with the auxiliary inductor to consume power induced from the snubber inductor and from the main inductor through the auxiliary inductor.

* * * * *